US005633987A

United States Patent [19]
Teng et al.

[11] Patent Number: 5,633,987
[45] Date of Patent: May 27, 1997

[54] AUTO-SCALING CONTROLLER AND METHOD OF USE THEREFOR

[75] Inventors: Dan Teng, Wheeling; Shay-Ping T. Wang, Long Grove, both of Ill.

[73] Assignee: Motorola, Inc., Schaumburg, Ill.

[21] Appl. No.: 282,118

[22] Filed: Jul. 28, 1994

[51] Int. Cl.$^6$ ................................................ G06F 15/18
[52] U.S. Cl. ............................................................ 395/22
[58] Field of Search ........................ 395/22, 23; 364/148

[56] References Cited

U.S. PATENT DOCUMENTS

| | | | |
|---|---|---|---|
| 4,719,561 | 1/1988 | Shigemasa | 364/148 |
| 4,979,126 | 12/1990 | Pao et al. | 364/513 |
| 5,038,269 | 8/1991 | Grimble et al. | 364/148 |
| 5,175,797 | 12/1992 | Funabashi et al. | 395/22 |
| 5,371,834 | 12/1994 | Tawel | 395/23 |
| 5,408,588 | 4/1995 | Ulug | 395/23 |
| 5,450,527 | 9/1995 | Wang | 395/22 |
| 5,455,890 | 10/1995 | Wang | 395/22 |
| 5,479,573 | 12/1995 | Keeler et al. | 395/23 |

OTHER PUBLICATIONS

Bruce E. Stuckman and Norman W. Laursen, "A Method of Control System Design Using Global Search", IEEE Transactions on Automatic Control, vol. 34, No. 1, Jan. 1989.

P.L. Stuckman and B.E. Stuckman, "Iterative Global Design of P.I.D. Controllers for Systems Without Models", Iasted International Symposium on Simulation & Modelling, Lugano, Switzerland, Jun. 1989.

B.E. Stuckman, M.C. Care and P.L. Stuckman, "System Optimization Using Experimental Evaluation of Design Performance", Eng. Opt., 1990, vol. 16, pp. 275–290.

Hoffmann, A neural feed–forward network with a polynomial nonlinearity, Neural networks for signal processing, proceedings of the IEEE special workshop, pp. 49–58 Sep. 2, 1992.

Fairbairn et al., A scalar H Explicit adaptive controller, Proceedings of the 27th conference on decision and control, pp. 1362–1365 Dec. 1988.

Jones, LQG Auto–Tuning, IEEE conference on control 1988, pp. 224–229 1988.

Forrest et al., Implementation of an industrial LQG self tuning controller for power system applications, Proceedings of the 30th conference on Decision and Control, pp. 1863–1868 Dec. 1991.

Garcia, FAM based controller as kalman filter alternative applied to ship's dynamic positioning control, IEEE 3rd conference on control applications, pp. 845–850 Feb. 1994.

Warwick et al., Weighted input predective controller, IEE proceedings on control theory and applications, pp. 16–20 Jan. 1988.

Mendes et al., Determination of weighting polynomials in generalised minimum variance controllers, IEE proceedings on control theory and applications, pp. 21–27 Jan. 1988.

Brasca et al., On automatic voltage regulator design for synchronous generators, 3rd IEEE conference on control applications, pp. 199–205 Feb. 1994.

Fan et al., Optimal design of GMV self–tuning controllers, IEEE international conference on systems engineering, pp. 331–335 1989.

*Primary Examiner*—Robert W. Downs
*Assistant Examiner*—Sanjiv Shah
*Attorney, Agent, or Firm*—Bruce E. Stuckman; Jeffrey G. Toler; Michael K. Lindsey

[57] ABSTRACT

An auto-scaling controller and a method for use therefor is provided. The control inputs and the control coefficients are multiplied by scaling values. The scaling values are then tuned using a descent-based optimization method in order to optimize system performance.

59 Claims, 14 Drawing Sheets

28

50

50

50

50

50

AUTO-SCALING CONTROLLER AND METHOD OF USE THEREFOR

RELATED INVENTION

The present invention is related to the following pending applications which are assigned to the same assignee as the present invention:

"Neural Network and Method of Using Same" having Ser. No. 08/076,601 filed on Jun. 14, 1993, and "Auto-Tuning Controller and Method of Use Therefor", Ser. No. 08/268,395 filed on Jun. 30, 1994.

The subject matter of the above identified related applications are hereby incorporated by reference into the disclosure of this invention.

FIELD OF THE INVENTION

This invention relates generally to automatic control systems and, in particular, to control systems which are capable of automatically tuning their parameters to optimized performance.

BACKGROUND OF THE INVENTION

Control systems are widely used today for machines, devices and industrial and economic processes. A configuration for a general control system is shown in FIG. 1. The system to be controlled 10 is connected in a feedback configuration with controller 12 which attempts to drive the system output 18 to the value of reference input 14. System output 18 is fed back via feedback path 16 where it is subtracted from reference input 14 to form an error signal 22. This error signal 22 is processed by controller 12 to generate a control output 20 which is in turn fed to the input of system 10. While there are a whole host of different control configurations and structures in use today, one with ordinary skill-in-the-art will realize that FIG. 1 represents the basic building block for these controllers.

The example of a particular controller implementation is a so-called PID or proportional, integral and derivative controller. This controller is so named since its control output is derived from a weighted sum of the input, the integral of the input, and the derivative of the input. This control strategy is widely used in industry possibly due to the fact that it is available as an off-the-shelf unit. However, the PID controller suffers from two major disadvantages: 1. It is difficult to determine (or tune) the control coefficients of a controller for a particular application; and 2. The simplicity of the control law makes this controller unsuitable for highly complex, high-order or highly nonlinear systems.

One method for tuning the parameters of a PID controller was developed by Ziegler and Nichols. The Ziegler/Nichols method, as known to those skilled in the art, is intended for manual tuning of the control parameters, and thus requires intervention by a skilled operator. A second method of tuning a PID controller was presented by Stuckman et al. in "System Optimization Using Experimental Evaluation of Design Performance", *Engineering Optimization* Vol. 16, 1990, pp. 275–289, and "Iterative Global Design of PID Controllers for Systems Without Models", *Proceedings of the 17th IASTED International Symposium—Simulation and Modelling*, June 1989, pp. 320–321. This method, while operating automatically, uses a complicated Bayesian global optimization methodology which requires extraordinary amounts of computation to converge upon a set of control parameters. Further, this auto-tuning controller is limited by the fundamental limitations of the underlying PID control structure and again is not suitable for many highly complex or nonlinear systems.

An additional class of control implementation is the so-called self-tuning adaptive controller. In this strategy, the system to be controlled is extensively modeled and the model is continuously updated mathematically based upon the performance of the system. While providing suitable performance for some applications, adaptive controllers require an extremely complicated control algorithm and extensive computation in their implementation. Further, a very accurate model of the system is required for the adaptive controller to effectively operate. The performance of the controller rapidly degrades when error between the model and the actual system is above nominal levels.

A further example of control implementation is the fuzzy logic controller. The fuzzy logic controller makes control decisions based upon a series of fuzzy logic rules which transform the control input into a control output via a nonlinear transfer characteristic. While the performance of the fuzzy logic controller is robust, in that it is capable of maintaining an adequate control even in the presence of substantial error between the system model and the actual system, the parameters of the fuzzy logic controller are difficult to tune given their nonintuitive relationship to the system output. Further, experience has shown that it is difficult to implement fuzzy logic controller designs for large and complicated systems.

Another class of control implementations is the polynomial controller. In the polynomial controller, the control output is a polynomial function of the control input. A method for tuning a polynomial controller was presented by Stuckman and Laursen, "A Method of Control System Design Using Global Search", *IEEE Transactions on Automatic Controls*, Vol. AC-34, No. 1, January 1989. This method uses a complicated Bayesian global optimization methodology which requires an extraordinary amount of computation. Further, this method is only operable for low-dimensional systems and has not been shown to function for polynomial controllers with more than ten terms.

Therefore, there is a significant need for a controller which is relatively robust, in that it is capable for providing adequate control when significant error is present between the model and the actual system. Further, there is also a significant need for a control system in which the parameters can be tuned automatically. Further, a significant need exists for a controller design which is capable of handling high-dimensional, highly complex, and nonlinear systems. In addition, a significant need exists for a method of tuning the parameters of the controller which provides for a short product development cycle, in that the tuning can be performed in a relatively simple and efficient manner by one who is not necessarily a control expert.

SUMMARY OF THE INVENTION

It is thus one advantage of the present invention that the parameters of a control system can be tuned automatically.

A further advantage of the present invention is that a controller is provided which can operate on high-dimensional, highly complex or highly nonlinear systems.

An additional advantage of the present invention is the relatively simple and efficient manner in which the control parameters of a controller can be tuned.

In one embodiment of the present invention there is provided a method for tuning the control coefficients of a controller. Values of the control coefficients are calculated from control transfer characteristic data by fitting the polynomial function of the controller to control transfer characteristic data. The control coefficients are multiplied by a scaling value. An error signal is then derived based on the difference between the system output and the desired output. The scaling value is then tuned using a descent-based optimization method in order to minimize the output error signal.

In an additional embodiment of the present invention there is provided a method for tuning a controller. The method includes the step of calculating a value of each of the plurality of control coefficients by fitting the polynomial function of the controller to a plurality of transfer characteristic data. The control coefficients are multiplied by a first scaling value and the control input is multiplied by a second scaling value. An output error signal is computed, over time, based on the difference between the system output and a desired output. The first and second scaling values are tuned using a descent-based optimization method to minimize the output error signal.

In an embodiment of the present invention there is also provided a method for tuning a controller. The method includes the step of multiplying each of the plurality of control inputs by a respective one of a like plurality of initial scaling values. An output error signal is computed, over time, based on the difference between the system output and the desired output. The plurality of first scaling values are tuned using an optimization method to minimize the output error signal.

In a further embodiment of the present invention there is provided a controller for controlling a system to a desired output. This controller includes calculating means for calculating values of the control coefficients from control transfer characteristic data by fitting the polynomial control function to control transfer characteristic data. First multiplying means are provided for multiplying the values of the control coefficients by an initial first scaling value. Error computing means computes, over time, an output error signal based upon the difference between the system output and a desired output. Adjusting means in the controller are used to tune the first scaling value using a descent-based optimization method to minimize the output error signal.

BRIEF DESCRIPTION OF THE DRAWINGS

The invention is pointed out with particularity in the appended claims. However, other features in the invention will become more apparent and the invention will be best understood by referring to the following detailed description in conjunction with the accompanying drawings in which

DETAILED DESCRIPTION OF A PREFERRED EMBODIMENT

It will be understood by one of ordinary skill in the art that the controller and tuner of the present invention may be implemented in hardware or software or any combination thereof.

Figure 1:
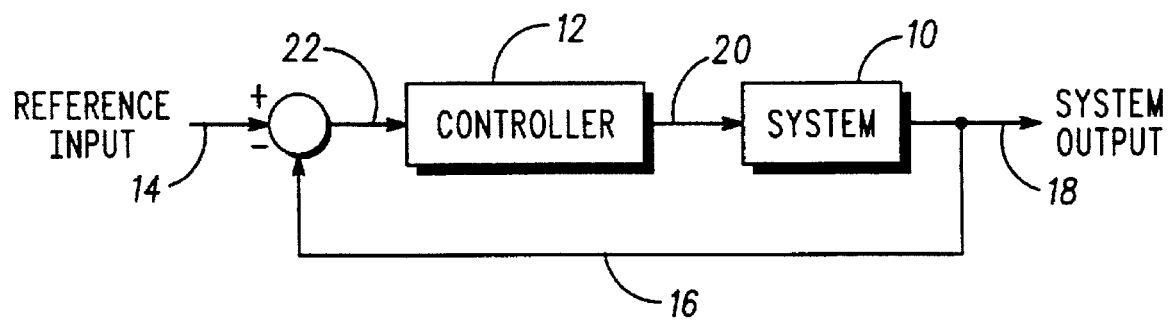
FIG. 1 shows a prior art control system.
Figure 2:
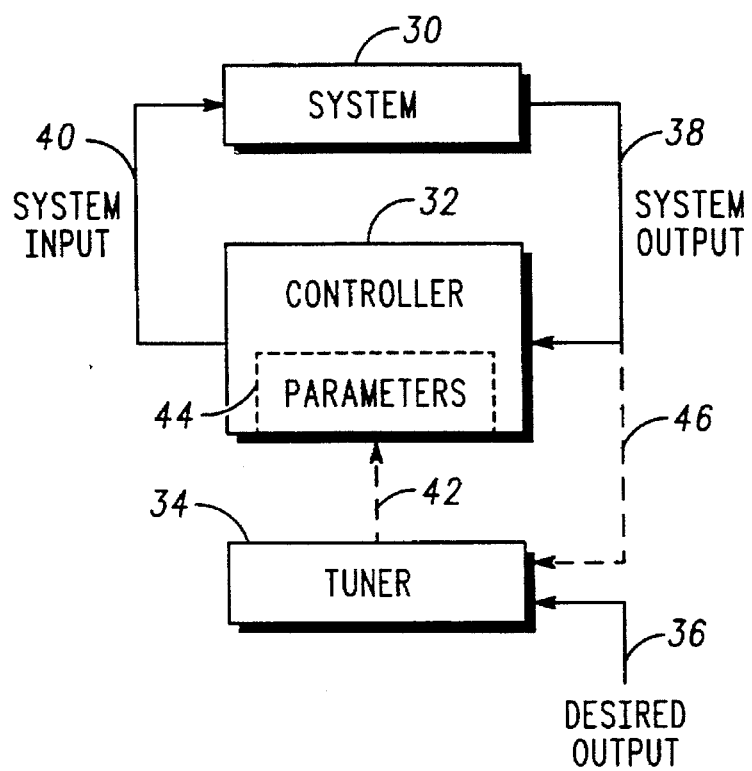
FIG. 2 shows a block diagram representation of one embodiment of the present invention.

FIG. 2 shows a block diagram representation of one embodiment of the present invention. In FIG. 2 a tuner for use in cooperation with a control system is presented. The system to be controlled 30 has a system input 40 and a system output 38. Controller 32 has an output which drives system input 40. The input to controller 32 is represented as being derived from the system output 38; however, one with ordinary skill-in-the-art will recognize that the input to controller 32, in a general sense, could be derived from the system output, the desired output, one or more measured or estimated states of the system 30, or any combination thereof. One with ordinary skill-in-the-art will also recognize that the output of controller 32 need not directly feed to system input 40. Rather, the output of controller 32 need only affect system input 40 in some fashion.

Controller 32 operates based upon a series of control parameters 44, such that the variation of control parameters 44 in turn varies the input/output relationship of controller 32 and, hence, varies the characteristics of system output 38. The process of implementing a particular controller 32 for a given application thus includes the determination of the proper values for control parameters 44.

These control parameter values are selected, in one embodiment of the present invention, by tuner 28. Tuner 28 is detachably connected to controller 32 via line 42 so as to adjust parameters 44. Further, tuner 28 has access to system output 38 via line 46 and desired output 36.

In operation, tuner 28 of the present invention compares system output 38 to desired output 36 in order to determine the proper value for control parameters 44 of controller 32. Once the proper values for control parameters 44 have been determined, tuner 28 can be detached and controller 32 can be left to control the system 30 autonomously. While this detachable arrangement for tuner 28 is preferred, other arrangements are possible, such as where tuner 28 is permanently connected to controller 32 to continuously tune the control parameters 44 of controller 32 or to operate only over selected intervals of time to periodically update control parameters 44.

Figure 3:
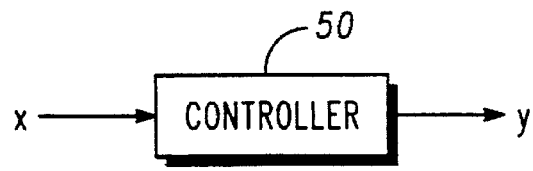
FIG. 3 shows a block diagram representation of the polynomial function controller 50 used in conjunction with one embodiment of the present invention.

FIG. 3 shows a block diagram representation of the polynomial function controller 50 used in conjunction with one embodiment of the present invention. The output Y of polynomial function controller 50 in response to an input X is given by the following general equation:

$$y = w_0 + w_1 x + w_2 x^2 + \ldots \quad \text{Equation (1)}$$

where $w_i$ represents the ith control coefficient. Thus the output of polynomial function controller 50 is expressed in terms of a plurality of control coefficients and a corresponding plurality of polynomial terms of arbitrary order. For instance, an arbitrary fourth order controller would be expressed as:

$$y = w_0 + w_1 x + w_2 x^2 + w_3 x^3 + w_4 x^4 \quad \text{Equation (2)}$$

It should be noted that the input to polynomial function controller 50 could be a vector quantity rather than the scalar quantity represented in FIG. 3 and further the output of function controller 50 could also be a vector quantity rather than the scalar quantity shown in FIG. 3. This yields the alternative structures for polynomial function controller 50 shown in FIGS. 4 through 6.

Figure 4:
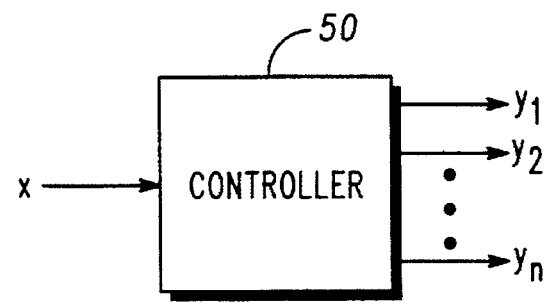
FIG. 4 shows a block diagram representation of a polynomial function controller used with another embodiment of the present invention.

FIG. 4 shows a block diagram representation of a polynomial function controller used with another embodiment of the present invention. A controller 50 has a scalar input and a vector output comprising a plurality of individual scalar outputs $y_1$, $y_2$ and $y_n$.

Figure 5:
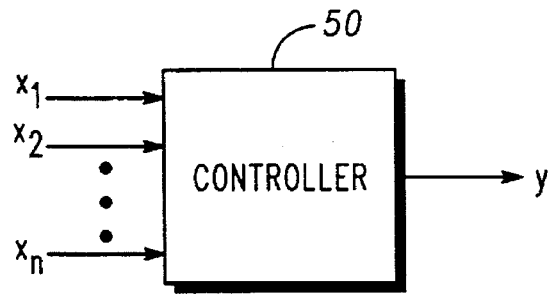
FIG. 5 shows a block diagram representation of a polynomial function controller used in conjunction with an additional embodiment of the present invention.

FIG. 5 shows a block diagram representation of a polynomial function controller used in conjunction with an additional embodiment of the present invention. Controller 50 has a vector input comprising a plurality of scalar inputs $x_1$, $x_2$ and $x_n$ and a scalar output.

Figure 6:
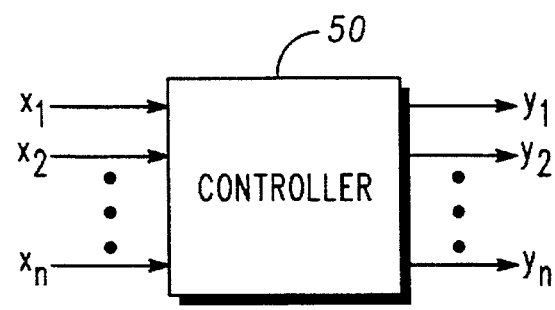
FIG. 6 shows a block diagram representation of a polynomial function controller used in conjunction with a further embodiment of the present invention.

FIG. 6 shows a block diagram representation of a polynomial function controller used in conjunction with a further embodiment of the present invention. Controller 50 has a vector input $x_1$, $x_2$ and $x_n$ and a vector output $y_1$, $y_2$ and $y_m$.

It should be noted that the polynomial controller of the present invention could be implemented by a structure described in the Related Invention referenced above.

Figure 7:
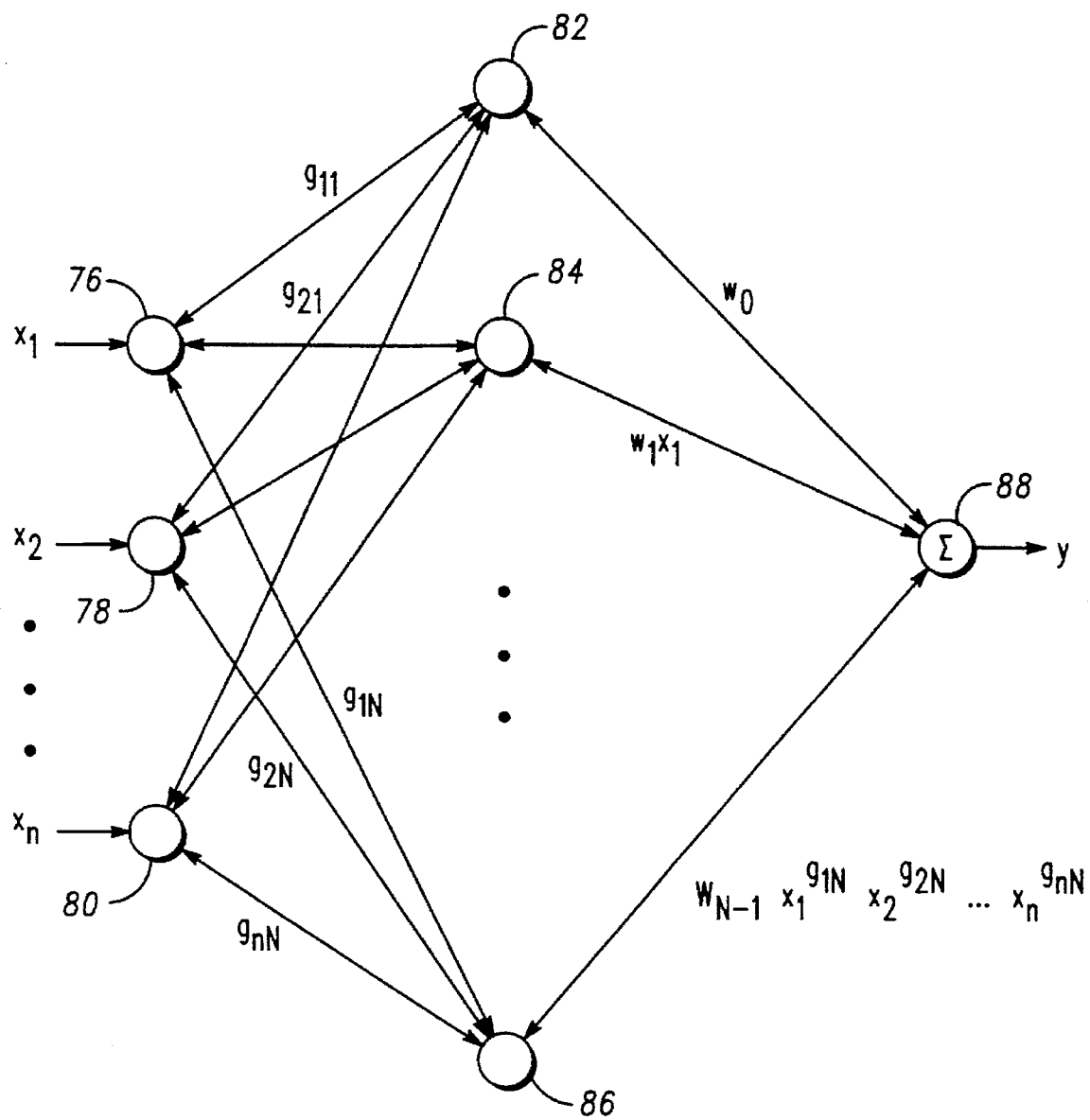
FIG. 7 shows a schematic representation of the polynomial controller used in one embodiment of the present invention.

FIG. 7 shows a schematic representation of the polynomial controller used in one embodiment of the present invention. A plurality of control inputs, $x_1, x_2, \ldots, x_n$ are fed to input nodes 76, 78, ... 80 of an input layer. The output of each input node 76, 78, ... 80 in the input layer is distributed at least one processing element of a hidden layer (of which only processing elements 82, 84, 86 are shown. Each processing element applies a gating function to each of the control inputs to produce a corresponding gated input. Any given processing element may apply a different gating function to each different control input it receives. For example, processing element 82 applies a gating function $g_{11}$ to the control input it receives from input node 76; it applies a gating function $g_{21}$ to the control input it receives from input node 78; and so forth. The gated inputs are multiplied together by a multiplier in the processing element to form a product, which is then multiplied by a predetermined weight value to produce the control output.

For example, in FIG. 7 processing element 82, which happens to be responsible for generating the $w_0$ term or the first control coefficient, multiplies its gated inputs together to form a product (which happens to be one because in this case the gating functions $g_{11}, g_{21}, \ldots g_{n1}$ are all 0, which is multiplied by a weight $w_0$ to produce a corresponding output $w_0$. Processing element 84 which happens to be responsible for generating the $w_1 x_1$ term of the control output, multiplies its gated inputs together to form a product (which happens to be $x_1$ because in this case the gated functions are all 0 except for the gating function that is applied to the $x_1$ output of the input node 76, which is multiplied by a weight $w_1$ to produce a corresponding output $x_1 w_1$. In like fashion, processing element 86 produces an output $w_{n-1} x_1$ to the power of $g_{1n} x_2$ to the power of $g_{2n} \ldots x_n$ to the power of $g_{nN}$. The outputs of processing elements 82, 84, ... 86 are summed together by a suitable summing means or function, such as summer 88, in an output layer to produce the output y of the polynomial controller as follows:

$$y = \sum_{i=1}^{m} w_{i-1} x_1^{g_{1i}} x_2^{g_{2i}} \ldots x_n^{g_{ni}} \quad \text{Equation (3)}$$

where m is an integer which represents the number of terms in the polynomial.

One with ordinary skill in the art will recognize the general nature of the controller showed in FIG. 7. Since linear terms are present and the various inputs could represent the system states and their derivatives, all linear controllers, (modern, classical, optimal, even PID) can be implemented in this fashion. Further, this control implementation allows the incorporation of additional non-linear terms into the control operation.

Figure 8:
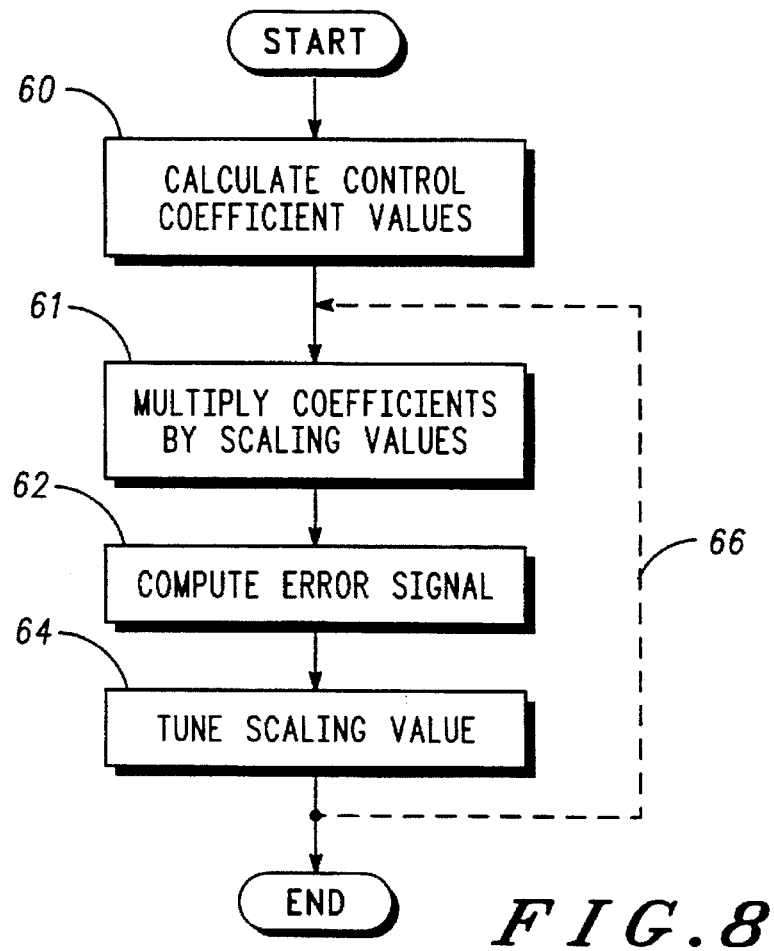
FIG. 8 shows a flow chart representation of one embodiment of the method of the present invention.

FIG. 8 shows a flow chart representation of one embodiment of the method of the present invention. In this embodiment the controller is tuned by tuning a single parameter, a scaling value which multiplies the control coefficients. First, regarding box 60, the value of each of the control coefficients is calculated by fitting the polynomial control function to control transfer characteristic data. Further, regarding Box 61, the control coefficients are multiplied by a scaling value. Next, regarding box 62, an output error signal is computed based upon the difference between the system output and the desired output. Regarding box 64, the scaling value is tuned using a descent-based optimization method. This optimization method is optionally an iterative approach which requires repeated computation of the output error signal in box 62 and repeated tuning of the scaling value in box 64 as presented by optional feedback path 66.

More particularly, the value of each of the control coefficients is calculated, in a preferred embodiment, based upon a plurality of control transfer characteristic data which characterizes the input/output relationship of the controller. This control transfer characteristic data could be derived from discrete samples of a continuous input/output control characteristic derived from any of a number of standard control methodologies. For instance, the system to be controlled could be modeled, and a proposed control input/output transfer characteristic could be developed based upon the development of a series of fuzzy logic rules which generate a fuzzy logic controller. Further, other conventional control techniques such as classical control, modern control, optimal control could be used to derive the desired input/output characteristic and thus the control transfer characteristic data required by the method used in a preferred embodiment.

Figure 9:
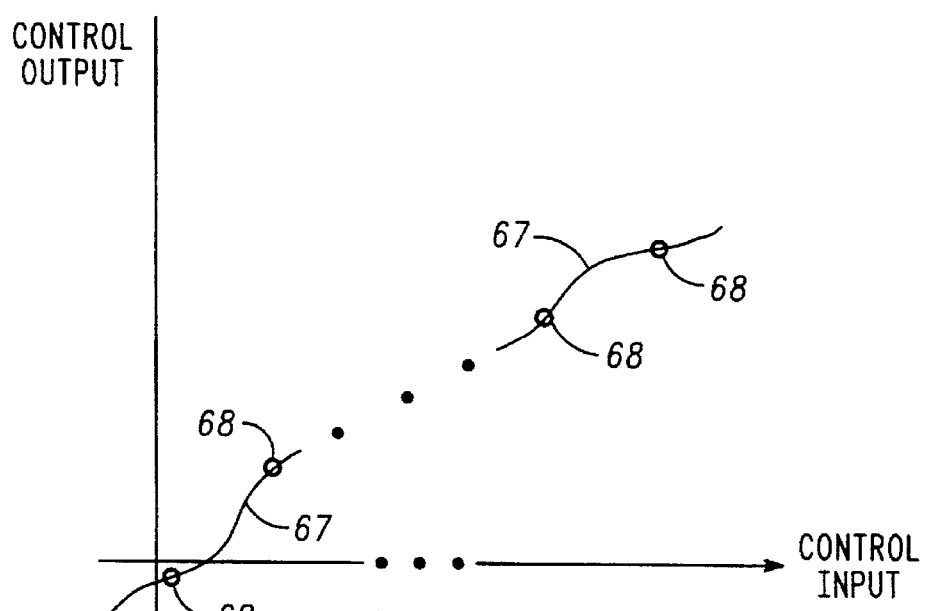
FIG. 9 shows sample control transfer characteristic data used to derive the initial control coefficient values in one embodiment of the present invention.

FIG. 9 shows sample control transfer characteristic data used to derive the initial control coefficient values in one embodiment of the present invention. This control transfer characteristic data 68 is used to derive the initial value of the control coefficients used in the present invention by calculating the best polynomial fit 67 to the data 68.

Figure 10:
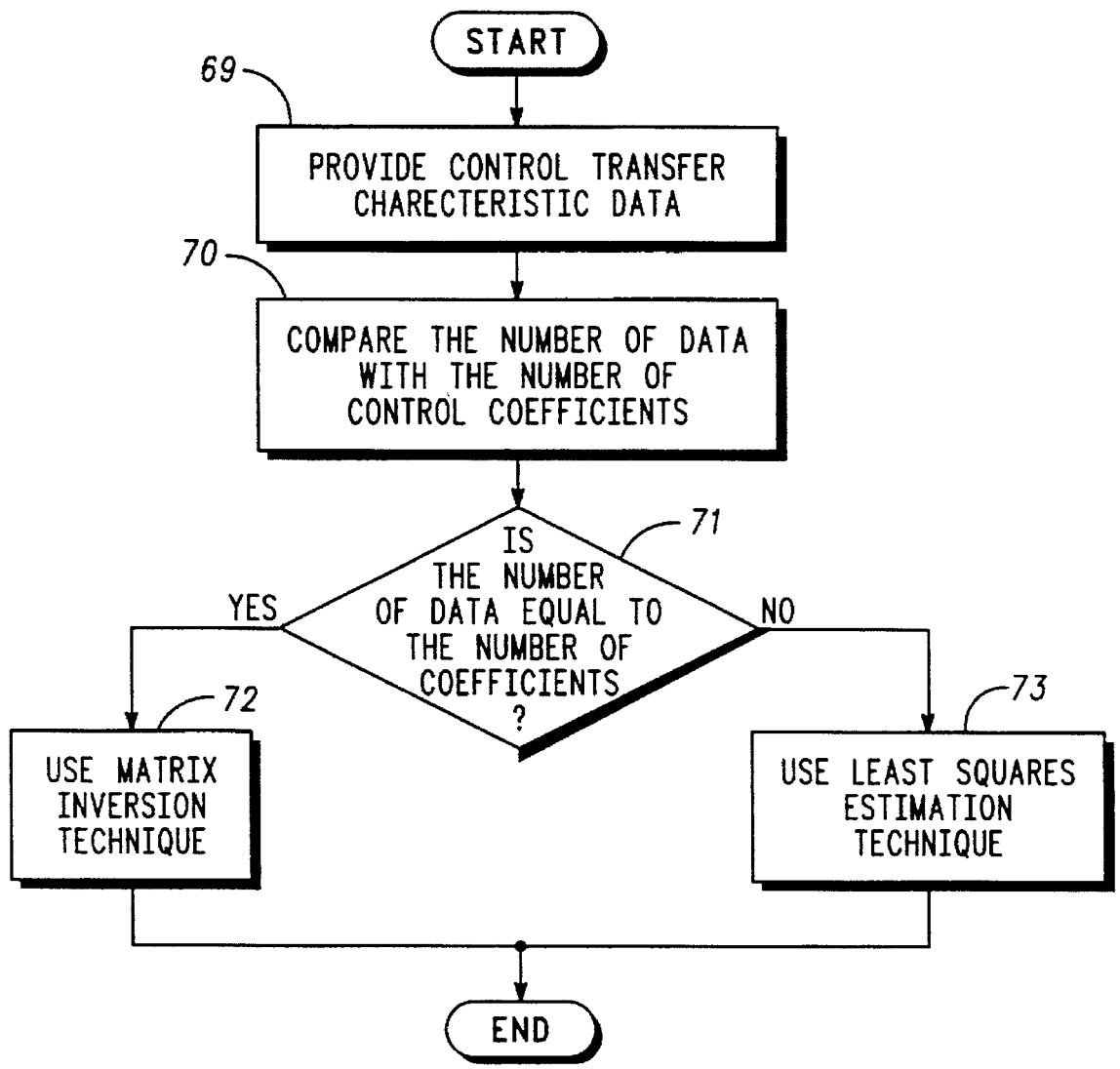
FIG. 10 shows a flow chart representation of a method of determining initial control coefficients used in one embodiment of the present invention.

FIG. 10 shows a flow chart representation of a method of determining initial control coefficients used in one embodiment of the present invention. In a preferred embodiment, the fit of the polynomial function to the control transfer characteristic data is performed in accordance with the flow chart presented in FIG. 10. First, regarding box 69, the control transfer characteristic data are provided. Next, regarding box 70, the number of data is compared with the number of control coefficients. Regarding decision box 71, if the number of data equal the number of control coefficients, the procedure goes to box 72 which indicates that a matrix inversion technique is used to solve for the initial value of each coefficient. If, on the other hand, the number of data is not equal to the number of control coefficients, the procedure goes to box 73, which indicates that a least squares estimation technique is used to solve for the initial value of each coefficient.

While a preferred embodiment is described herein, one with ordinary skill-in-the-art will recognize that other suitable estimation techniques, for example, extended least squares, pseudo inverse, Kalman filtering techniques, maximum likelihood techniques, Bayesian estimation, polynomial splines, and alike, could likewise be used to fit the control polynomial to the control transfer characteristic data.

Figure 11:
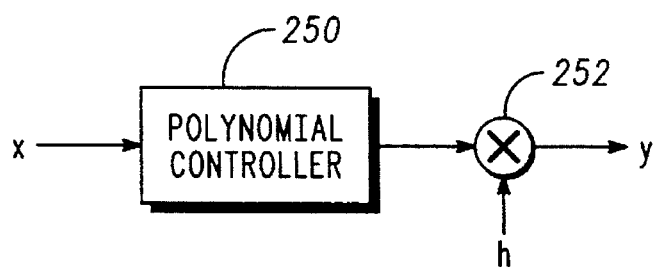
FIG. 11 shows a block diagram representation of the controller 50 used in one embodiment of the present invention.

FIG. 11 shows a block diagram representation of the controller 50 used in one embodiment of the present invention. Controller 50 includes polynomial controller 250 which generates an output which is a polynomial function of its input X. Further, multiplier 252 multiplies the output of polynomial controller 250 by a scaling value h. The output Y of controller 50 can be expressed in the following form:

$$y = h(w_0 + w_1 x + w_2 x^2 + \ldots) \quad \text{Equation (4)}$$

where $w_0$, $w_1$ and $w_2$, etc. are the coefficients of polynomial controller 250. Multiplying the scaling value h through the polynomial expansion of Equation (4) yields the expression below:

$$y = hw_0 + hw_1 x + hw_2 x^2 + \ldots \quad \text{Equation (5)}$$

thus, multiplication by scaling value h on the output of polynomial controller 250 provides a multiplication of each of the individual control coefficients by the scaling value h. It should be noted, that the embodiment of FIG. 11 is merely one structure for accomplishing the step of multiplying the control coefficients by a scaling value recited in box 61 of FIG. 8. One with ordinary skill in the art will recognize that other structures, including the multiplication of each of the individual control coefficients by h, could likewise be accomplished.

Figure 12:
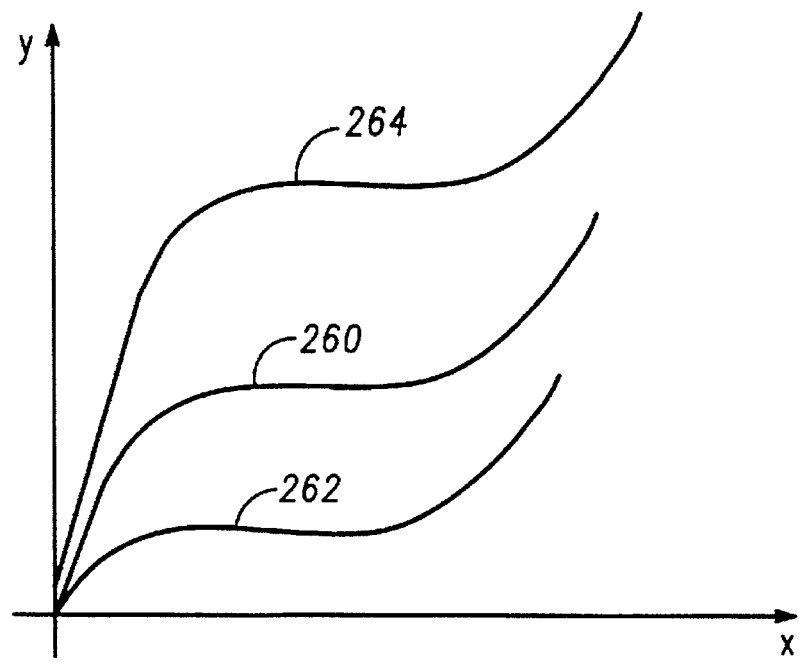
FIG. 12 shows the variation of sample control transfer characteristic curves based upon varying values of the scaling value H.

FIG. 12 shows the variation of sample control transfer characteristic curves based upon varying values of the scaling value h. Control transfer characteristic curve 260 illustrates an example relationship between the input X and output Y of a nonlinear controller such as controller 50. If h is equal to 1, then control transfer characteristic curve 260 corresponds to the transfer characteristic of polynomial controller 250 as illustrated in FIG. 11. If scaling value h is decreased, the control transfer characteristic curve is proportionally reduced as shown by sample curve 262 in FIG. 12. Alternatively, if scaling value h is increased, the control transfer characteristic curve is scaled upward, as shown by sample transfer characteristic 264.

It should be noted that tuning the control coefficients in this manner can be implemented using a relatively simple optimization method. The low-dimensional characteristics of this optimization, make it simpler for the optimization method to converge quickly.

While the embodiment of FIG. 11 is described in terms of a scalar control input x, one with ordinary skill in the art will recognize that the same method and system would apply for a controller 50 with a vector input comprising a series of individual inputs. In this embodiment of the present invention, the output y of the controller 50 would be given by Equation (6).

$$y = h \sum_{i=1}^{m} w_{i-1} x_1^{q1i} x_2^{q2i} \ldots x_n^{qni} \quad \text{Equation (6)}$$

Multiplying scaling value h into the sum yields their relationship presented in Equation (7).

$$y = \sum_{i=1}^{m} hw_{i-1} x_1^{q1i} x_2^{q2i} \ldots x_n^{qni} \quad \text{Equation (7)}$$

Thus, scaling value h multiplies each of the control coefficients of polynomial controller 250.

Referring back to FIG. 8, the computation of the output error signal described in box 62 can be accomplished in several ways. In a preferred embodiment, the absolute difference between the system output and the desired output is accumulated over time to generate an objective function which rates the performance of a given set of control coefficients. On the other hand, other techniques for deriving this objective function could be used. For instance, sum squared error could be used to replace the absolute error in this calculation. Further, features of the output response could be extracted such as rise time, steady state error, percent overshoot, etc., could be used in some fashion to derive a rating or score for the performance of a given set of control coefficients and thus be used to generate an output error signal.

Figure 13:
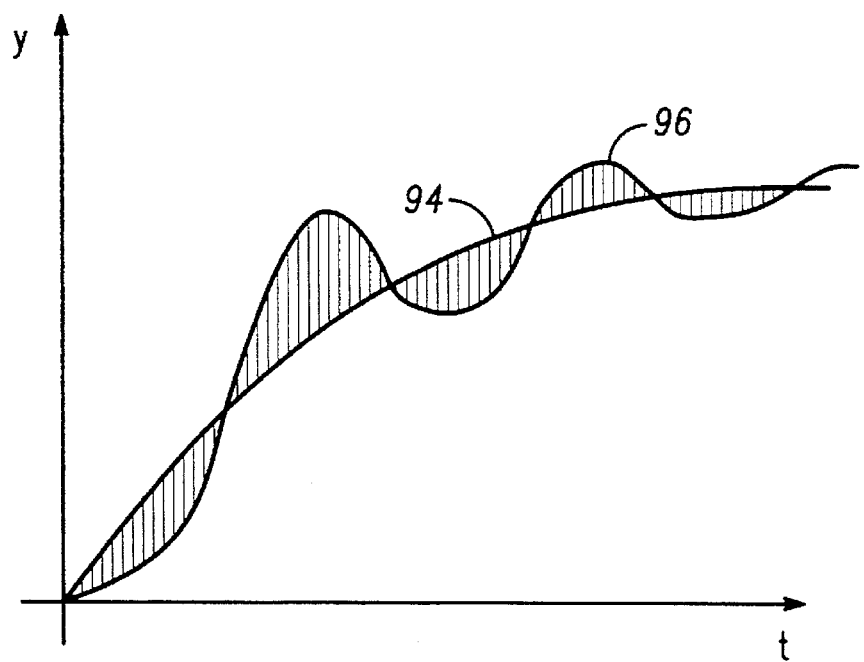
FIG. 13 shows a sample accumulation of error between the desired and control system outputs used in one embodiment of the present invention.

FIG. 13 shows a sample accumulation of error between the desired and control system outputs used in one embodiment of the present invention. Actual system output 96 is compared with desired output 94 at discrete increments of time. These absolute errors are accumulated over a sample response to generate the output error signal.

Referring back to FIG. 8, the tuning of the scaling values using descent-based optimization presented in box 64 can also be accomplished in several ways. Descent-based local optimization methods such as gradient methods, conjugate gradient methods, downhill simplex methods, variable metric methods, direction set methods, and the like, could all be used to converge upon a scaling value which minimizes the output error signal. Further, a global descent-based global optimization method such as simulated annealing could also be used to calculate the best scaling value based upon the calculated initial value.

The initial value for the scaling value in the various embodiments of the present invention can be any arbitrary value which allows rapid convergence of the optimization technique. In a preference embodiment the various initial scaling values discussed herein is chosen to be 1.

Figure 14:
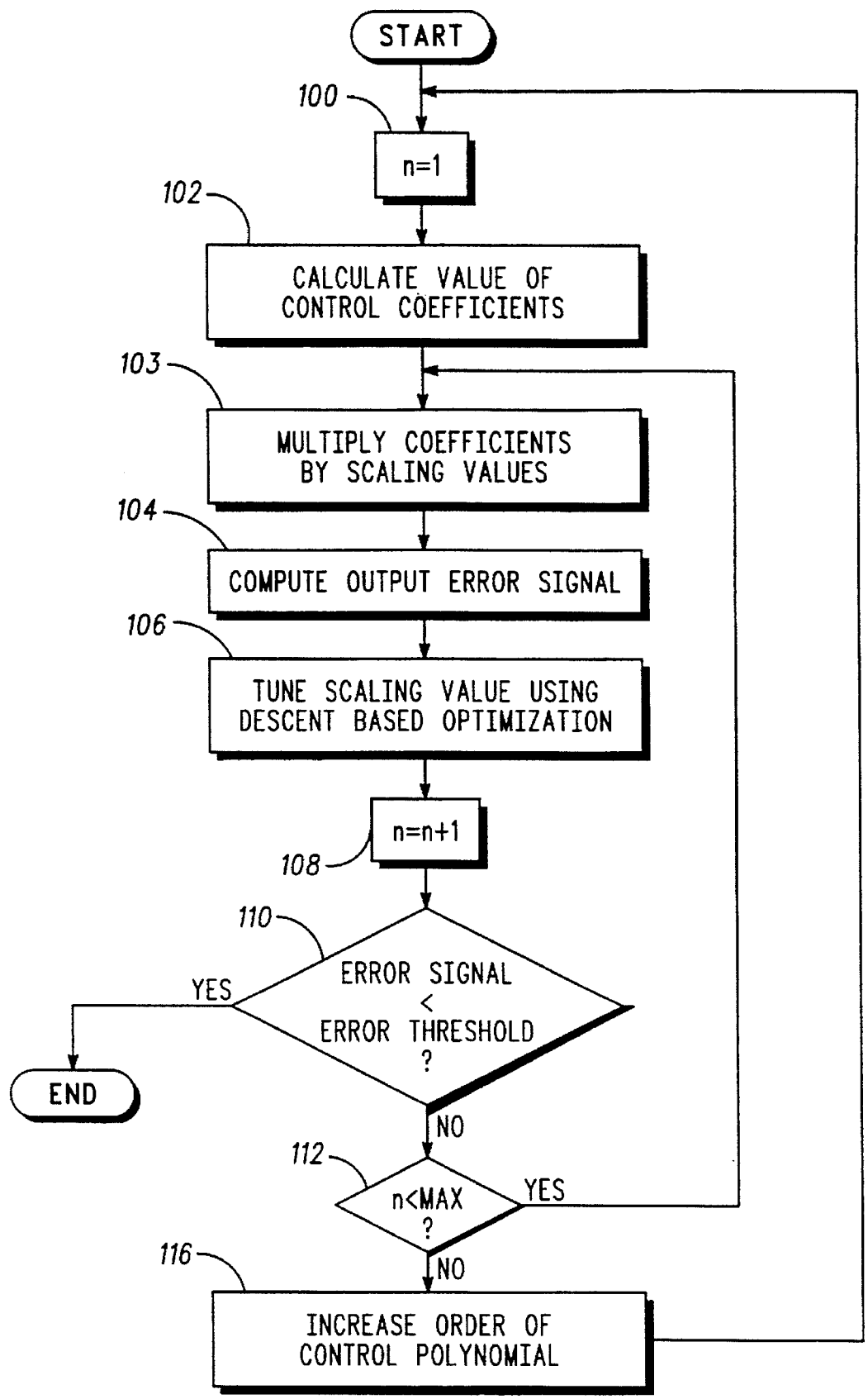
FIG. 14 shows a flow chart representation of an alternative embodiment of the method of the present invention.

FIG. 14 shows a flow chart representation of an alternative embodiment of the method of the present invention. First, regarding box 100, a loop variable n is initialized to 1. Next, the value of each of the control coefficients is calculated by fitting the polynomial control function to control transfer characteristic data as illustrated in box 102. The control coefficients are multiplied by a scaling value as shown in box 103. The output error signal is then computed as illustrated in box 104 and the scaling value is tuned using a descent-based optimization method as illustrated in box 106. Loop variable n is then incremented as illustrated in box 108. Next, the error signal is compared with an error threshold, as shown in decision box 110. If the error is less than the threshold, the tuning ends. If, however, the error is not less than the threshold, the method proceeds to box 112.

Decision box 112 serves to continue the execution of descent-based optimization to tune the scaling value based upon a computed output error signal as shown in boxes 106 and 104 until the loop variable n reaches a predetermined value (max). Once (max) iterations have been performed, the method proceeds to box 116, and the order of the control polynomial is increased.

Increasing the order of the control polynomial adds at least one additional term to the polynomial and therefore adds at least one additional control coefficient. In this embodiment of the present invention, the method proceeds to box 100 where the loop variable is reset to one and new values of the control coefficients are calculated by fitting the new polynomial function with the increased order to the control transfer characteristic data.

The method then proceeds as before by tuning the scaling value using the descent-based optimization method in hopes of achieving an output error signal which is less than the error threshold. It should be noted that the order of the control polynomial will be repetitively increased until the output error signal finally falls below the error threshold.

Figure 15:
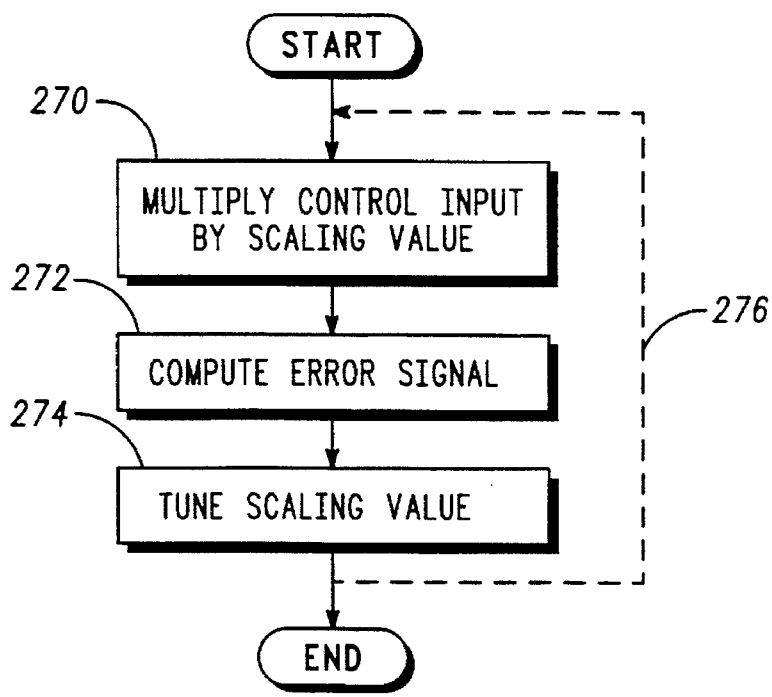
FIG. 15 presents a flow chart representation of an additional embodiment of the method of the present invention.

FIG. 15 presents a flow chart representation of an additional embodiment of the method of the present invention. In this embodiment, one or more scaling values for the control input are the parameters which are tuned. First, regarding box 270, the control input is multiplied by a scaling value. Next, regarding box 272, an output error signal is computed based upon the difference between the system output and the desired output. Regarding box 274, the scaling values are tuned using an optimization technique. This optimization technique is optionally an iterative approach which requires repeated computation of the output error signal in box 272 and repeated tuning of the scaling value in box 274 as presented by optional feedback path 276.

Figure 16:
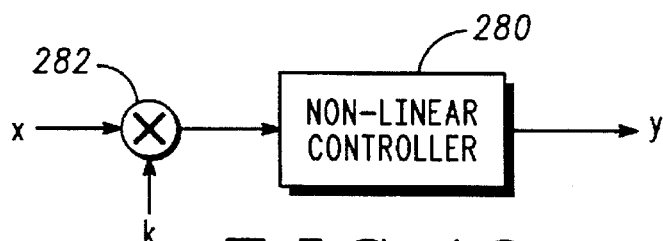
FIG. 16 shows a block diagram representation of an optional structure for controller 50 used in conjunction with one embodiment of the present invention.

FIG. 16 shows a block diagram representation of an optional structure for controller 50 used in conjunction with one embodiment of the present invention. Controller 50 includes non-linear controller 280 which is responsive to the input X multiplied by a scaling value k in multiplier 282.

Therefore, the output Y of controller 50 embodied by the structure of FIG. 16 is given by the following relationship:

$$y = (w_0 + w_1(kx) + w_2(kx)^2 + \dots)$$  Equation (8).

Figure 17:
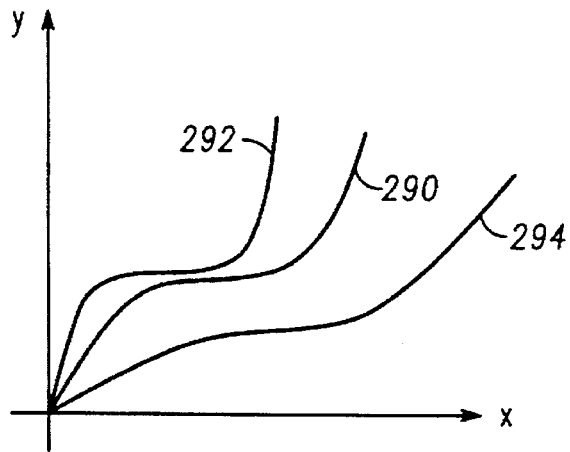
FIG. 17 presents the variation of a sample control transfer characteristic curve based upon the variation of the input scaling value K.

FIG. 17 presents the variation of a sample control transfer characteristic curve based upon the variation of the input scaling value k. Given a nominal transfer characteristic 290, which represents the transfer characteristic of non-linear controller 280 of FIG. 16, if scaling value k is greater than 1, transfer curve 290 is compressed in the X direction such as transfer characteristic 292. Likewise, if the value of k is less than 1, the transfer characteristic 290 is stretched in the X direction, in a manner similar to transfer characteristic 294.

It should be noted that the embodiment of FIG. 16, while presented in terms of a scalar input X, could easily apply to a non-linear controller with a vector input representing a plurality of individual inputs. An expression for the output Y of controller 50 of one such embodiment of the present invention is presented in Equation (9).

$$y = \sum_{i=1}^{m} w_i - 1(kx_1)^{g1i}(kx_2)^{g2i} \dots (kx_n)^{gni}$$  Equation (9)

In this embodiment, one scaling value k is used to scale each of the control inputs $x_1, x_2, \dots x_n$. In an alternative embodiment of controller 50, the output y is given by Equation (10).

$$y = \sum_{i=1}^{m} w_{i-1}(k_1 x_1)^{g1i}(k_2 x_2)^{g2i} \dots (k_n x_n)^{gni}$$  Equation (10)

In this embodiment, individual scaling values $k_i$ are used for each of the individual inputs $x_i$. Therefore input $x_1$ has a corresponding scaling value $k_1$, $x_2$ has a corresponding scaling value $k_2$ etc.

Figure 18:
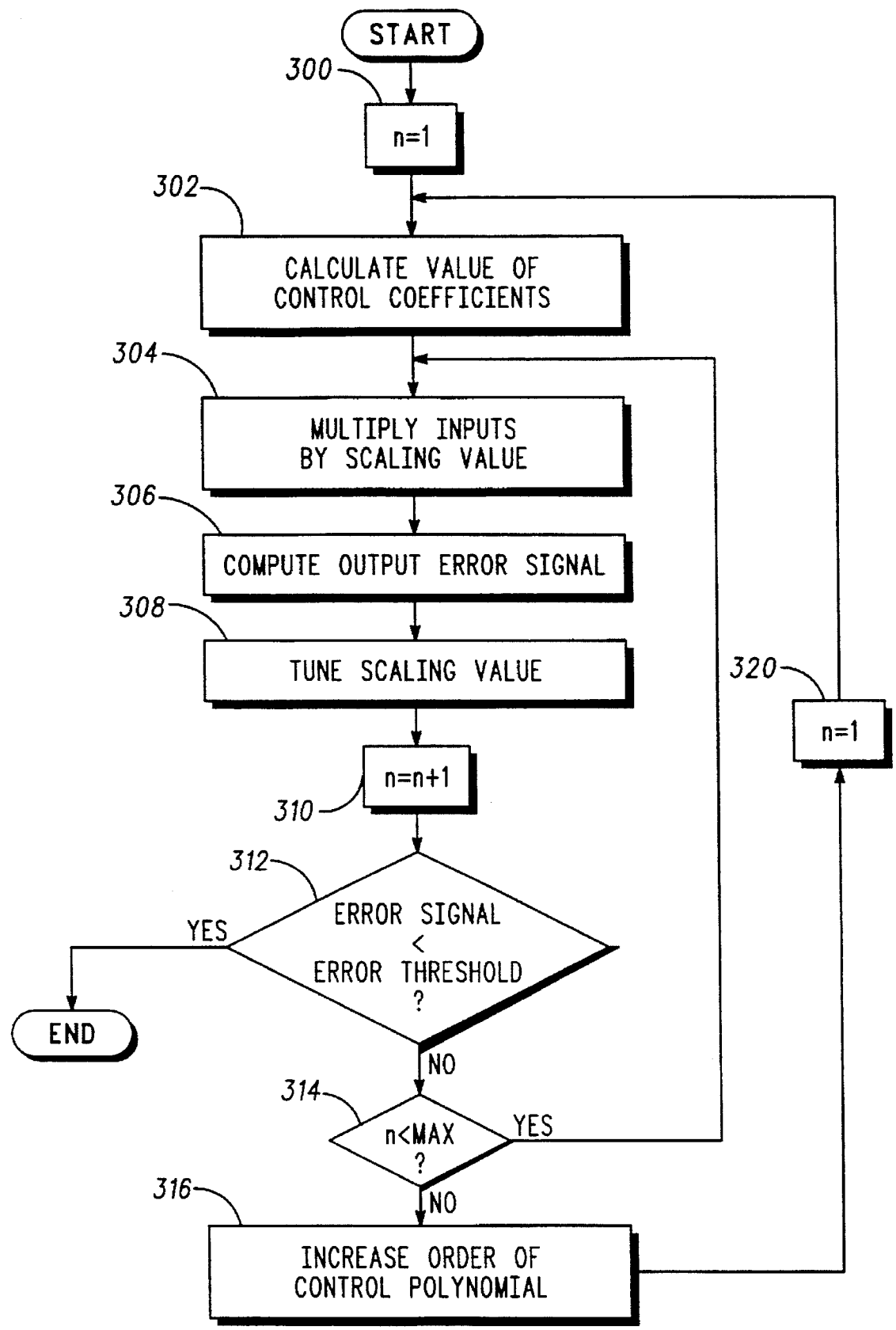
FIG. 18 presents a flow chart representation of yet another embodiment of the method of the present invention.

FIG. 18 presents a flow chart representation of yet another embodiment of the method of the present invention. The method starts by initializing a loop variable n to a value of one as shown in box 300. Next, the values of the control coefficients are calculated by fitting the polynomial control function to control transfer characteristic data as shown in box 302. The control input is multiplied by a scaling value as illustrated in box 304. An output error signal is then computed as illustrated in box 306, and the scaling value is tuned using a descent-based optimization method as shown in box 308. The loop variable n is then incremented as shown in box 310, and steps 304, 306, and 308 are then repeated, as long as the error signal is less than the error threshold (as governed by box 312, until the loop variable attains a value max as governed by decision box 314.

If the error signal falls below the threshold, the tuning ends. Otherwise, when (max) iterations have been performed, the order of the polynomial is increased as shown in box 316, the loop variable n is reset to 1 as shown in box 320 and the new polynomial function is fit to the control transfer characteristic data to calculate new values of the control coefficients in box 302. Tuning of the scaling value then proceeds iteratively until the error signal is less than a threshold, with the order of the polynomial being repetitively increased if the error signal still exceeds the error threshold after max iterations.

Figure 19:
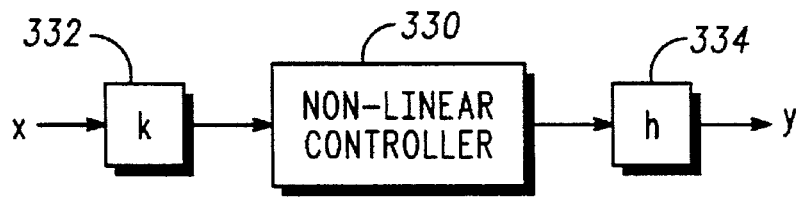
FIG. 19 shows a block diagram representation of an alternative embodiment of the present invention.

FIG. 19 shows a block diagram representation of an alternative embodiment of the present invention. In this embodiment, controller 50 includes non-linear controller 330. The input X to non-linear controller 330 is scaled by scaling value k as shown in box 332. Further, the output of non-linear controller 330, and thus the control coefficients of non-linear controller 330 are scaled by scaling value h as shown in box 334. Therefore, the output Y of controller 50 as shown in FIG. 19 is given by Equation (11).

$$y=hw_0+hw_1(kx)+hw_2(kx)^2+ \ldots \quad \text{Equation (11)}$$

Figure 20:
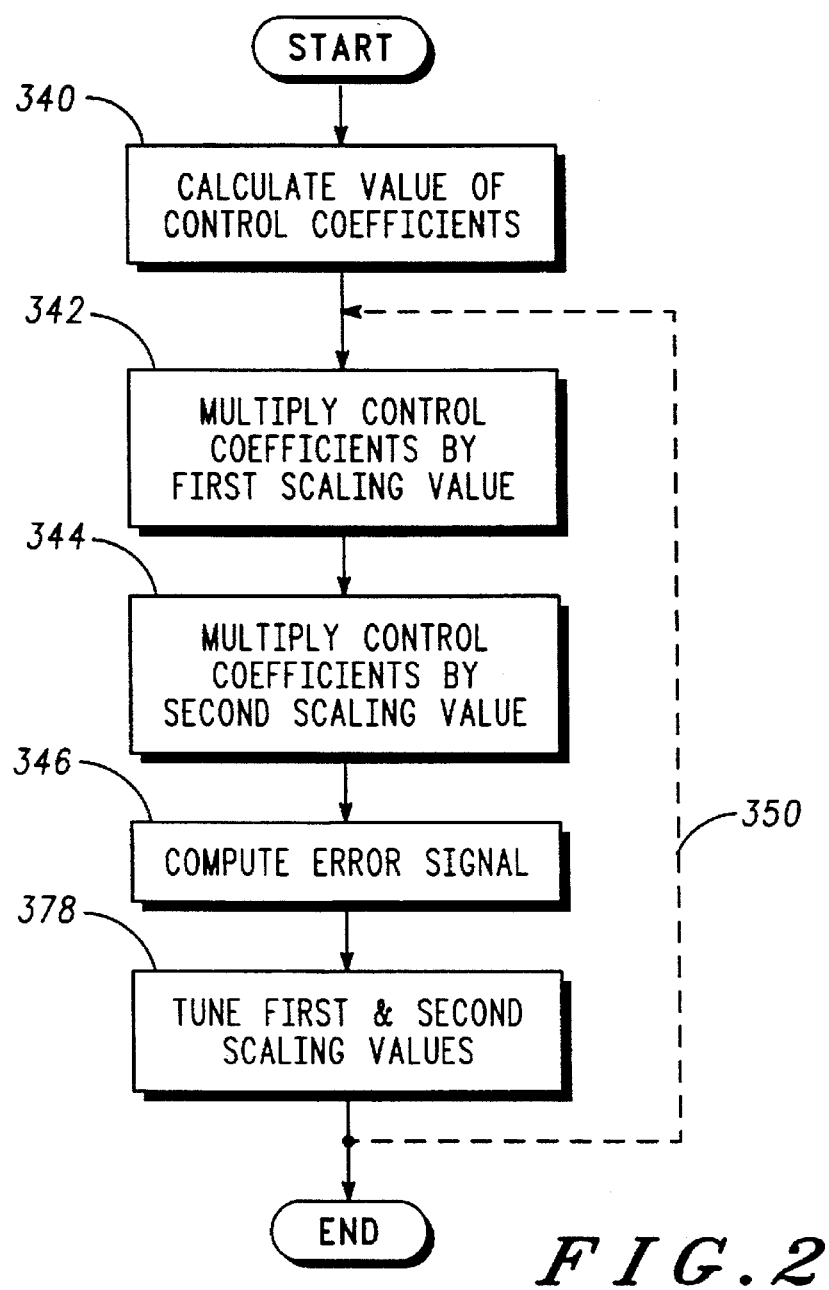
FIG. 20 shows an alternative embodiment of the method of the present invention.

FIG. 20 shows an alternative embodiment of the method of the present invention. First, regarding box 340, the value of each of the control coefficients is calculated. Next, regarding box 342, the control coefficients are multiplied by a first scaling value. Regarding box 344, the control input is multiplied by a second scaling value. Further, regarding box 346, an output error signal is computed based upon the difference between the system output and the desired output. Regarding box 348, the first and second scaling values are tuned using a descent-based optimization method. This optimization method is optionally an iterative approach which requires repeated multiplication of the first and second scaling values as shown in boxes 342 and 344, repeated computation of the output error signal as shown in box 346, and repeated tuning of the first and second scaling values as shown in 348, as presented by optional feedback path 350.

Figure 21:
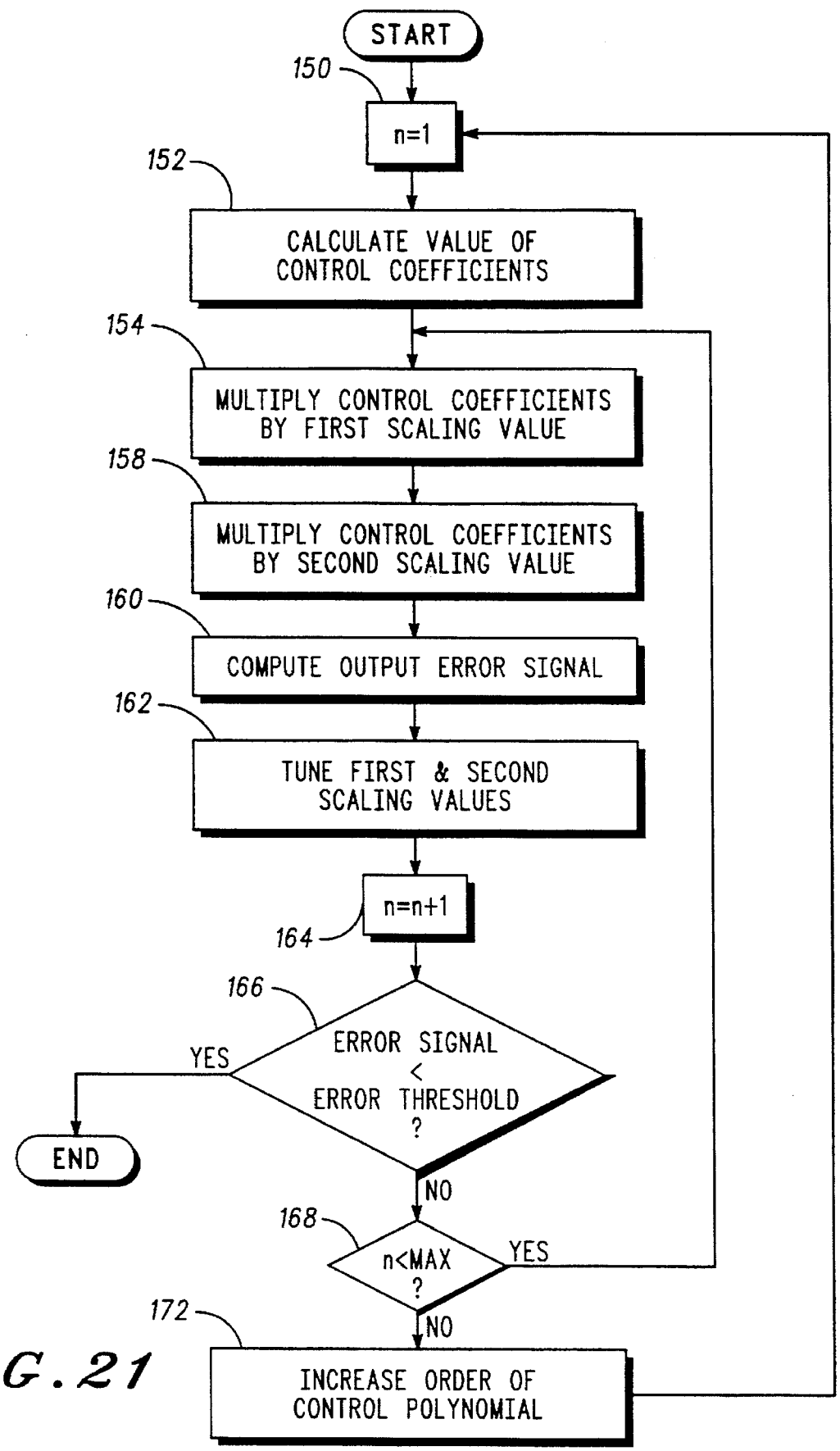
FIG. 21 presents a flow chart representation of yet another embodiment of the method of the present invention.

FIG. 21 presents a flow chart representation of yet another embodiment of the method of the present invention. The method starts by initializing a loop variable n to a value of 1 as shown in box 150. Next, the values of the control coefficients are calculated by fitting the polynomial control function to control transfer characteristic data as shown in box 152. The control coefficients are multiplied by a first scaling value as shown in box 154. The control input is multiplied by a second scaling value as shown in box 158. An output error signal is then computed as illustrated in box 160 and the first and second scaling values are tuned using a descent-based optimization method as shown in box 162. The loop variable end is then incremented as shown in box 164, and steps 154, 158, 160, and 162 are then repeated as long as the error signal is less than the error threshold (as governed by box 166), until the loop variable attains a value (max) as governed by decision box 168.

If the error signal falls below the threshold, the tuning ends. Otherwise, when max iterations have been performed, the order of the polynomial is increased as shown in box 172, the loop variable end is reset to 1 as shown in box 150, and the new polynomial's function is fit to the control transfer characteristic data to calculate new values of the control coefficients in box 152. Tuning of the first and second scaling values then proceeds iteratively until the error signal is less than a threshold, with the order of the polynomial being repetitively increased if the error signal still exceeds the error threshold after max iterations.

While the various embodiments of the present invention have been presented in terms of a controller 50 which has a scalar output and a scalar input, it should be noted that these embodiments could likewise be applied to other, more general, controller configurations. In these more complex configurations, the introduction of additional scaling values only serves to provide additional parameters to be tuned using the descent-based optimization technique.

Figure 22:
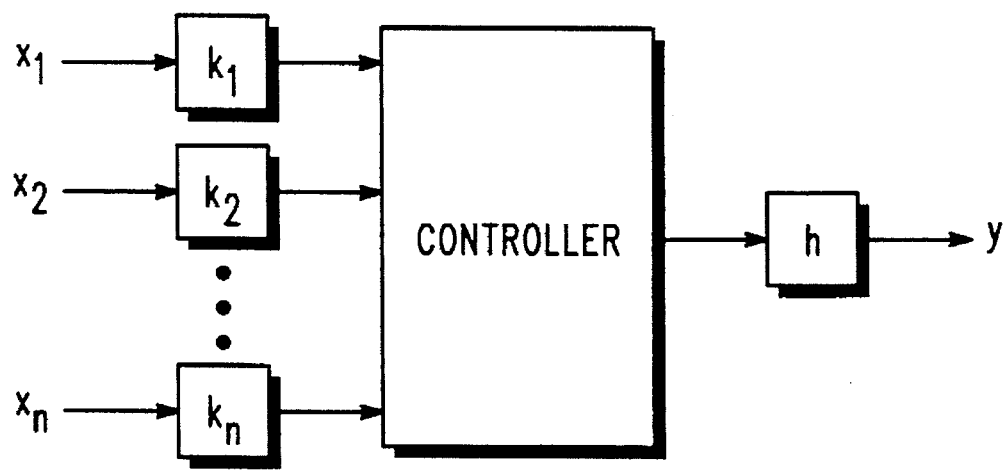
FIG. 22 shows a block diagram representation of a controller used with a further embodiment of the present invention.

FIG. 22 shows a block diagram representation of a controller used with a further embodiment of the present invention. A controller 50 has a scalar output and a vector input comprising a plurality of individual scalar inputs $x_1, x_2 \ldots x_n$. Each of the individual inputs $x_i$ has a corresponding scaling value $k_i$. In general, the output of controller 50 can be expressed by Equation (12).

$$y = \sum_{i=1}^{m} hw_{i-1}(k_1x_1)^{g_{1i}} (k_2x_2)^{g_{2i}} \ldots (k_nx_n)^{g_{ni}} \quad \text{Equation (12)}$$

Figure 23:
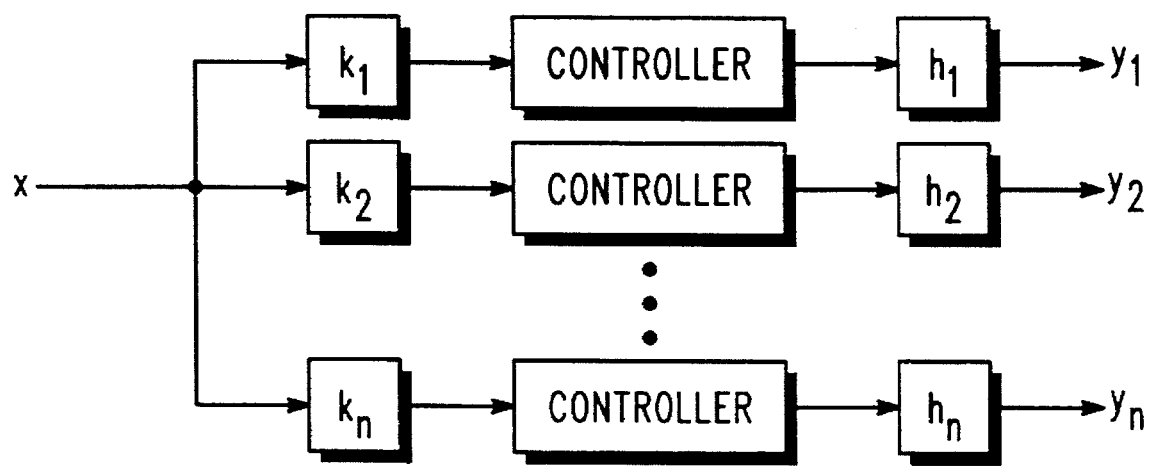
FIG. 23 shows a block diagram representation of a polynomial controller used in conjunction with an additional embodiment of the present invention.

FIG. 23 shows a block diagram representation of a polynomial controller used in conjunction with an additional embodiment of the present invention. Controller 50 comprises a plurality of individual controllers, each with a respective output $y_j$. Each output is a function of the coefficients of the corresponding individual controller, as well as the corresponding input scaling constant $k_j$ and output scaling constant $h_j$ as presented in Equation (13). Similarly the output $y_j$ of an individual controller could be represented by Equation (14).

$$y_j = \sum_{i=1}^{m} h_j w_{i-1}(k_jx)^{g_i} \quad \text{Equation (13)}$$

$$y_j = h_jw_o + h_j(k_jx) + h_j(k_jx)^2 + \ldots h_j(k_jx)^{m-1} \quad \text{Equation (14)}$$

Figure 24:
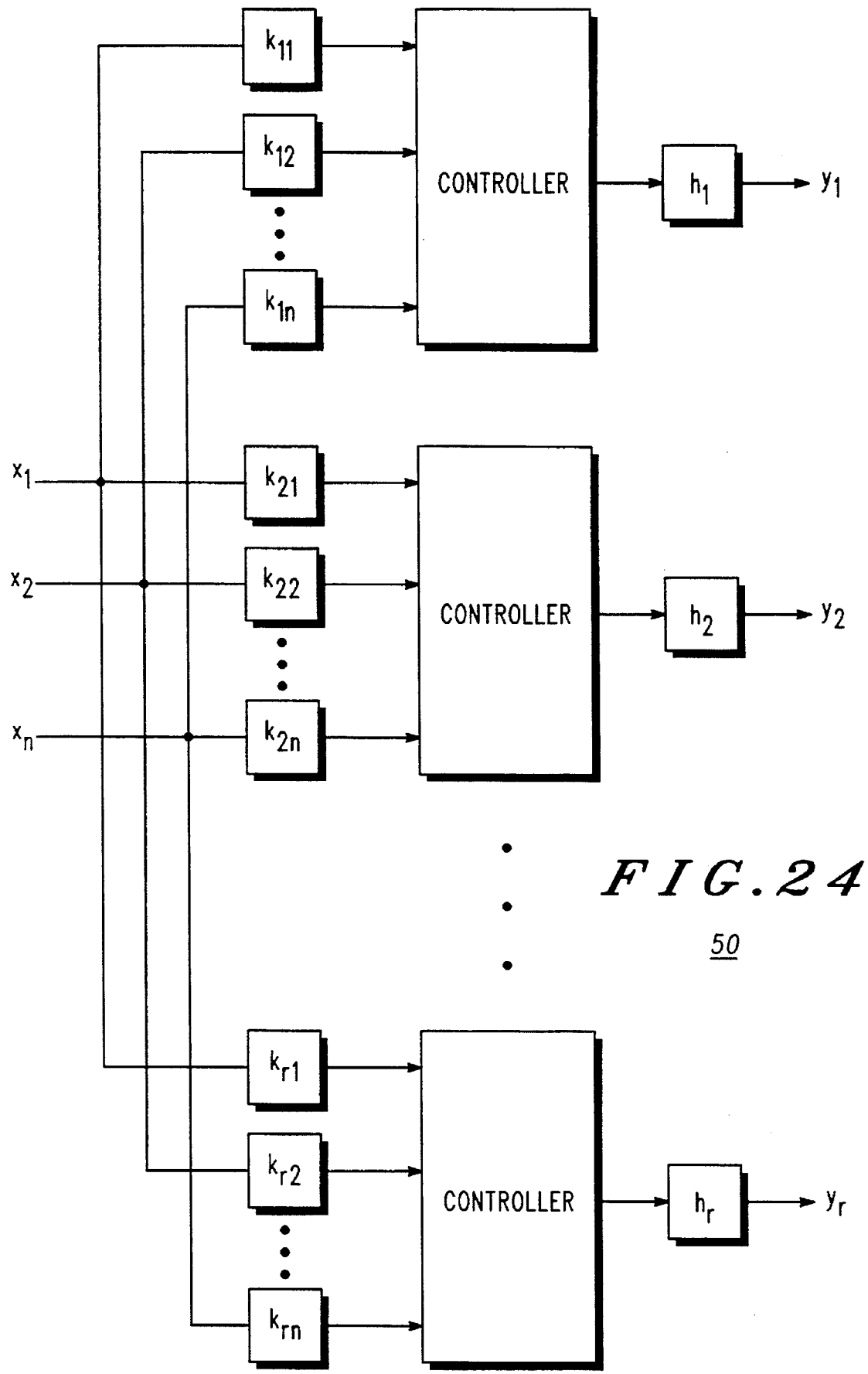
FIG. 24 shows a block diagram representation of the polynomial controller used in conjunction with a further embodiment of the present invention.

FIG. 24 shows a block diagram representation of the polynomial controller used in conjunction with a further embodiment of the present invention. In this embodiment, polynomial controller 50 consists of a series of individual controllers generating a like plurality of outputs $y_j$. Further, each individual controller is responsive to a subset of a plurality of control inputs $x_i$ and arbitrary output $y_j$ of the corresponding individual controller is presented in Equation (15).

$$y_j = \sum_{i=1}^{m} h_jw_{i-1}(k_{j1}x_1)^{g_{1i}} (k_{j2}x_2)^{g_{2i}} \ldots (k_{jn}x_n)^{g_{ni}} \quad \text{Equation (15)}$$

Figure 25:
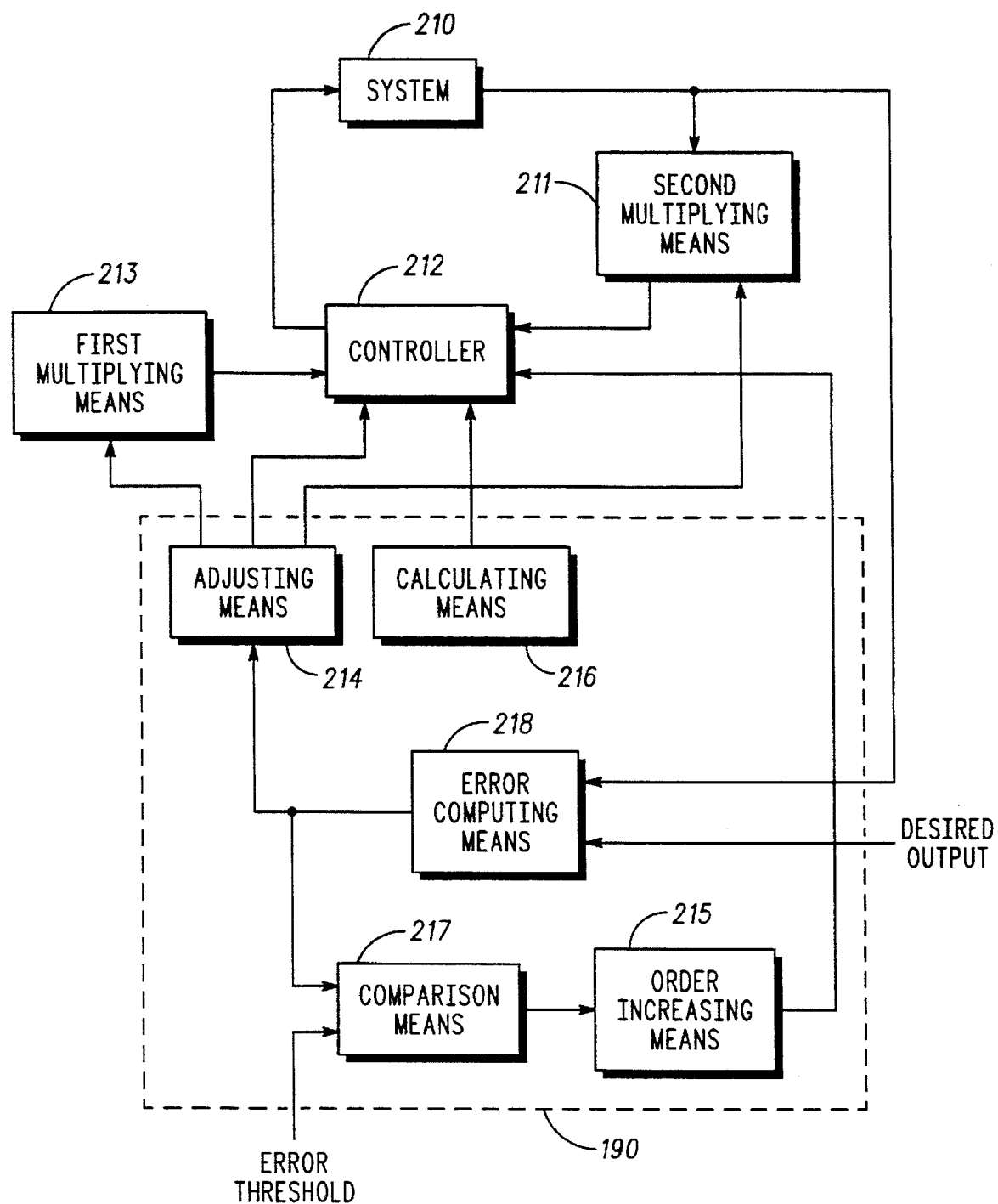
FIG. 25 shows a block diagram representation of the controller of one embodiment of the present invention.

FIG. 25 shows a block diagram representation of the controller of one embodiment of the present invention. In FIG. 25 the tuner 190 of the present invention is shown in conjunction with controller 212 whose operation is based upon a polynomial function having a plurality of control coefficients. Tuner 190 includes calculating means 216 for calculating a value of each of the plurality of control coefficients by fitting the control polynomial to a plurality of control transfer characteristic data. Tuner 190 also includes error computing means 218 for computing over time an output error signal based upon the difference between the system output and a desired output. First multiplying means 213 multiplies the coefficients of the controller by a first scaling value. Second multiplying means 211 multiplies the input or inputs to the controller by one or more second scaling values. Further, tuner 190 includes adjusting means 214 for tuning the value of the first and second scaling values using a descent-based optimization method to minimize the output error signal. Comparison means 217 compares the output error signal to an error threshold. If the error is greater than the threshold after a number of iterations of the optimization method, the order of the polynomial of controller 212 is increased by order increasing means 215.

It should be understood that tuner 190 of the present invention in a preferred embodiment would be implemented using a software program operating on a processor. However, one with ordinary skill in the art will recognize that the functions described herein could further be implemented by a hardware device such as an ASIC or programmable logic array which performs the same functions that would be performed by the software program.

It will be apparent to those skilled in the art that the disclosed invention may be modified in numerous ways and may assume many embodiments other than performed form specifically set out and described above. Accordingly, it is intended by the pending claims to cover all modifications of the invention which fall within the true spirit and scope of the invention.

What is claimed is:

1. In a controller, having a control input, for controlling a system to a desired output, the system having a time dependent system output, a controller operation based on a polynomial function having an order, a plurality of control coefficients and a corresponding plurality of polynomial terms, a method for tuning the controller, the method comprising:

a) calculating a value for each of the plurality of control coefficients by fitting the polynomial function to a plurality of control transfer characteristic data;

b) multiplying the values of the control coefficients by a scaling value;

c) computing an output error signal based on a difference between the time dependent system output and the desired output; and d) tuning the scaling value using a descent-based optimization method to reduce the output error signal;

e) comparing the output error signal to an error threshold; and f) increasing the order of the polynomial function based on the comparison between the output error signal and the error threshold by adding at least one new polynomial term and a corresponding at least one new control coefficient.

2. The method of claim 1 wherein steps b), c) and d) are repeated at least once.

3. The method of claim 1 wherein steps b), c) and d) are repeated continuously.

4. The method of claim 1 further comprising the step of:

calculating a new value for the plurality of control coefficients and the at least one new control coefficient.

5. The method of claim 4 further comprising the step of repeating steps b), c) and d) for the new value for the plurality of control coefficients.

6. The method of claim 1 wherein the system input is a vector quantity comprising a plurality of individual system inputs.

7. The method of claim 1 wherein the control input is a vector quantity comprising a plurality of individual control inputs.

8. The method of claim 1 further comprising the step of generating the control transfer characteristic data based on at least one fuzzy logic control rule.

9. The method of claim 1 further comprising the step of generating the control transfer characteristic data from a continuous nonlinear control transfer characteristic.

10. The method of claim 1 wherein the step of calculating the value for each of the plurality of control coefficients includes a least squares method.

11. The method of claim 1 wherein the step of calculating the value for each of the plurality of control coefficients includes a matrix inversion technique.

12. The method of claim 1 further comprising the step of:

scaling the control input by multiplying the control input by an initial second scaling value;

wherein the step of tuning includes cooperatively tuning the first scaling value and the second scaling value using the descent-based optimization method.

13. In a controller, having a control input, for controlling a system to a desired output a method comprising the steps of:

a) calculating a value for each of a plurality of control coefficients by fitting a polynomial function to a plurality of control transfer characteristic data;

b) multiplying the values of the control coefficients by an first scaling value;

c) multiplying the control input by a second scaling value;

d) computing, over time, an output error signal based on a difference between the system output and the desired output;

e) tuning the first and second scaling values using a descent-based optimization method;

f) comparing the output error signal to an error threshold: and g) increasing the order of the polynomial function based on the comparison between the output error signal and the error threshold by adding at least one new polynomial term and a corresponding at least one new control coefficient.

14. The method of claim 13 wherein steps b)–e) are repeated at least once.

15. The method of claim 13 wherein steps b)–e) are repeated continuously.

16. The method of claim 13 further comprising the step of:

calculating a new value for the plurality of control coefficients and the at least one new control coefficient.

17. The method of claim 16 further comprising the step of repeating steps b)–e) for the new value for the plurality of control coefficients.

18. The method of claim 13 wherein the system input is a vector quantity comprising a plurality of individual system inputs.

19. The method of claim 13 wherein the control input is a vector quantity comprising a plurality of individual control inputs.

20. The method of claim 13 further comprising the step of generating the control transfer characteristic data based on at least one fuzzy logic control rule.

21. The method of claim 13 further comprising the step of generating the control transfer characteristic data from a continuous nonlinear control transfer characteristic.

22. The method of claim 13 wherein the step of calculating the value for each of the plurality of control coefficients includes a least squares method.

23. The method of claim 13 wherein the step of calculating the value for each of the plurality of control coefficients includes a matrix inversion technique.

24. A controller for controlling a system to a desired output, the system having a time dependent system output, the controller comprising:

calculating means, operatively coupled to the controller, for calculating a value for each of a plurality of control coefficients by fitting a polynomial function to a plurality of control transfer characteristic data;

first multiplying means operatively coupled to the calculating means for multiplying the values of the control coefficients by a scaling value;

error computing means for computing an output error signal based on a difference between the system output and the desired output; and adjusting means, operatively coupled to the computing means and to the controller, for tuning the scaling value using a descent-based optimization method;

comparison means, operatively coupled to the error computing means, for comparing the output error signal to an error threshold; and order increasing means, operatively coupled to the controller, for increasing an order of the polynomial function if the output error signal exceeds an error threshold by adding at least one new polynomial term and a corresponding at least one new control coefficient.

25. The controller of claim 24 wherein the error computing means and the coefficient adjusting means cooperate to iteratively converge on a minimum error signal.

26. The controller of claim 24 further comprising:
means, operatively coupled to the controller, for calculating a new initial value for the plurality of control coefficients and the at least one new control coefficient.

27. The controller of claim 24 wherein the error computing means and the coefficient adjusting means cooperate to iteratively converge on a minimum error signal based on the new initial value for the plurality of control coefficients.

28. The controller of claim 24 wherein the system input is a vector quantity comprising a plurality of individual system inputs.

29. The controller of claim 24 wherein the control input is a vector quantity comprising a plurality of individual control inputs.

30. The controller of claim 24 wherein the control transfer characteristic data are generated based on at least one fuzzy logic control rule.

31. The controller of claim 24 wherein the control transfer characteristic data are generated from a continuous nonlinear control transfer characteristic.

32. The controller of claim 24 wherein the value for each of the control coefficients is calculated using a least squares method.

33. The controller of claim 24 wherein the value for each of the control coefficients is calculated using a matrix inversion technique.

34. The controller of claim 24 further comprising second multiplying means for scaling the control input by multiplying the control input by an initial second scaling value and wherein the adjusting means includes means for cooperatively tuning the first scaling value and the second scaling value using the descent-based optimization method to minimize the output error signal.

35. In a controller, having a plurality of control inputs and a plurality of control outputs, for controlling a system to a first desired output, the system having a time dependent system output a method for tuning the controller comprising the steps of:
a) calculating a value for each of a plurality of first control coefficients by fitting a polynomial function to a plurality of first control transfer characteristic data;
b) multiplying the values of the first control coefficients by a scaling value;
c) computing a first output error signal based on a difference between the one of the plurality of system outputs and the first desired output;
d) tuning the first scaling value using a descent-based optimization method;
e) comparing the first output error signal to an error threshold; and
f) increasing an order of the first polynomial function if the first output error signal exceeds the error threshold by adding at least one new polynomial term and a corresponding at least one new first control coefficient.

36. The method of claim 35 wherein steps b), c) and d) are repeated at least once.

37. The method of claim 35 wherein steps b), c) and d) are repeated continuously.

38. The method of claim 35 further comprising the step of:
calculating a new value for the plurality of first control coefficients and the at least one new first control coefficient.

39. The method of claim 38 further comprising the step of repeating steps b), c) and d) for the new initial value for the plurality of first control coefficients.

40. The method of claim 1 wherein the controller operation is based on a second polynomial function having an order, a plurality of second control coefficients and a corresponding plurality of polynomial terms, the second polynomial function defining a second of the plurality of control outputs in terms of at least one of the plurality of control inputs, the method further comprising the steps of:
calculating a value for each of the plurality of second control coefficients by fitting the polynomial function to a second plurality of control transfer characteristic data; and
multiplying the values of the second control coefficients by an initial second scaling value.

41. The method of claim 40 further comprising the steps of:
computing, over time, a second output error signal based on the difference between the second of the plurality of system outputs and a second desired output; and
d) tuning the second scaling value using a descent-based optimization method to minimize the output error signal.

42. The method of claim 35 further comprising the step of generating the first control transfer characteristic data based on at least one fuzzy logic control rule.

43. The method of claim 35 further comprising the step of generating the first control transfer characteristic data from a continuous nonlinear control transfer characteristic.

44. The method of claim 35 wherein the step of calculating the value for each of the plurality of first control coefficients includes a least squares method.

45. The method of claim 35 wherein the step of calculating the value for each of the plurality of first control coefficients includes a matrix inversion technique.

46. The method of claim 35 further comprising the step of:
scaling the plurality of control inputs by multiplying each of the control inputs by a respective one of a plurality of initial third scaling values;
wherein the step of tuning includes cooperatively tuning the first scaling value and the plurality of third scaling values using the optimization method to minimize the output error signal.

47. In a controller, having a plurality of control inputs, for controlling a system to a desired output, the system having a time dependent system output a method for tuning the controller comprising the steps of:
a) multiplying each of a plurality of control inputs by a respective one of a like plurality of scaling values;
b) computing an output error signal based on a difference between the system output and the desired output;
c) tuning the plurality of scaling values using an optimization method to reduce the output error signal;
d) comparing the output error signal to an error threshold; and
e) increasing an order of the polynomial function in response to the comparison between the output error signal and the error threshold by adding at least one new polynomial term and a corresponding at least one new control coefficient.

48. The method of claim 47 wherein steps b) and c) are repeated at least once.

49. The method of claim 47 wherein steps b) and c) are repeated continuously.

50. The method of claim 47 further comprising the step of calculating a value for each of the plurality of control coefficients by fitting the polynomial function to a plurality of control transfer characteristic data.

51. The method of claim 50 further comprising the step of:

calculating a new value for the plurality of control coefficients and the at least one new control coefficient.

52. The method of claim 51 further comprising the step of repeating steps b) and c) the new initial values of the plurality of control coefficients.

53. The method of claim 47 wherein the system input is a vector quantity comprising a plurality of individual system inputs.

54. The method of claim 50 wherein the control transfer characteristic data are generated based on at least one fuzzy logic control rule.

55. The method of claim 50 further comprising the step of generating the control transfer characteristic data from a continuous nonlinear control transfer characteristic.

56. The method of claim 50 wherein the step of calculating the value for each of the plurality of control coefficients includes a least squares method.

57. The method of claim 50 wherein the step of calculating the value for each of the plurality of control coefficients includes a matrix inversion technique.

58. The method of claim 47 further comprising the step of:

multiplying the control coefficients by an initial second scaling value;

wherein the step of tuning includes cooperatively tuning the first scaling value and the second scaling value using the descent-based optimization method to minimize the output error signal.

59. The method of claim 47 wherein the optimization method is a descent-based optimization method.

* * * * *